(12) United States Patent
Maysick et al.

(10) Patent No.: US 9,981,813 B2
(45) Date of Patent: May 29, 2018

(54) SYSTEM AND METHOD FOR MONITORING AND CONTROLLING DOCUMENT VELOCITY IN A SCANNING SYSTEM

(71) Applicant: KODAK ALARIS INC., Rochester, NY (US)

(72) Inventors: Randall Maysick, Churchville, NY (US); Stephen M. Reinke, Rochester, NY (US); Robert Westcott, Holly, NY (US)

(73) Assignee: KODAK ALARIS INC., Rochester, NY (US)

( * ) Notice: Subject to any disclaimer, the term of this patent is extended or adjusted under 35 U.S.C. 154(b) by 0 days. days.

(21) Appl. No.: 15/164,581

(22) Filed: May 25, 2016

(65) Prior Publication Data
US 2016/0264369 A1 Sep. 15, 2016

Related U.S. Application Data

(63) Continuation of application No. 14/287,877, filed on May 27, 2014, now Pat. No. 9,352,915.

(51) Int. Cl.
*B65H 3/06* (2006.01)
*H04N 1/047* (2006.01)
*H04N 1/12* (2006.01)

(52) U.S. Cl.
CPC ............ *B65H 3/06* (2013.01); *H04N 1/047* (2013.01); *H04N 1/1215* (2013.01); *B65H 2513/511* (2013.01); *B65H 2553/51* (2013.01); *H04N 2201/0471* (2013.01); *H04N 2201/04756* (2013.01)

(58) Field of Classification Search
CPC ............................ B65H 3/06; B65H 2513/10; B65H 2513/108; B65H 2513/511; B65H 2553/51
See application file for complete search history.

(56) References Cited

U.S. PATENT DOCUMENTS 6,128,106 A  10/2000  Watanabe et al.
6,333,797 B1  12/2001  Katsuta et al.
(Continued)

FOREIGN PATENT DOCUMENTS

CN  1578372 A  2/2005
CN  102204237 A  9/2011

OTHER PUBLICATIONS

International Search Report for PCT/US2015/030808 dated Jul. 29, 2015.
(Continued)

*Primary Examiner* — Michael C McCullough
(74) *Attorney, Agent, or Firm* — Hogan Lovells US LLP

(57) ABSTRACT

A method of scanning documents and moving such documents along a path such that during scanning a method of improving the documents velocity and the documents image quality is disclosed. The method includes providing a plurality of documents in an input tray and transporting each document along the path from the input tray at a transport velocity past the scanner to obtain scanned image data. By monitoring and controlling the velocity profile of the transport system, the scanning system may provide higher image quality, reduce slippage, misfeeds and jams, and provide alerts to an operator in the even slippage, misfeeds, or jams do occur.

10 Claims, 6 Drawing Sheets

(56) References Cited

U.S. PATENT DOCUMENTS

| | | |
|---|---|---|
| 7,275,740 B2 | 10/2007 | Abie et al. |
| 7,357,387 B2 * | 4/2008 | Asada ..................... B65H 7/18 271/10.02 |
| 8,087,670 B2 | 1/2012 | Noguchi |
| 2004/0114202 A1 | 6/2004 | Ogata |
| 2005/0012969 A1 | 1/2005 | Matsuyama et al. |
| 2010/0012744 A1 | 5/2010 | Hammen |
| 2012/0256365 A1 | 10/2012 | Yagamata |

OTHER PUBLICATIONS

Chinese Office Action dated Sep. 5, 2017 issued in Chinese Patent Application No. 201580027976.0 (Chinese Language).

* cited by examiner

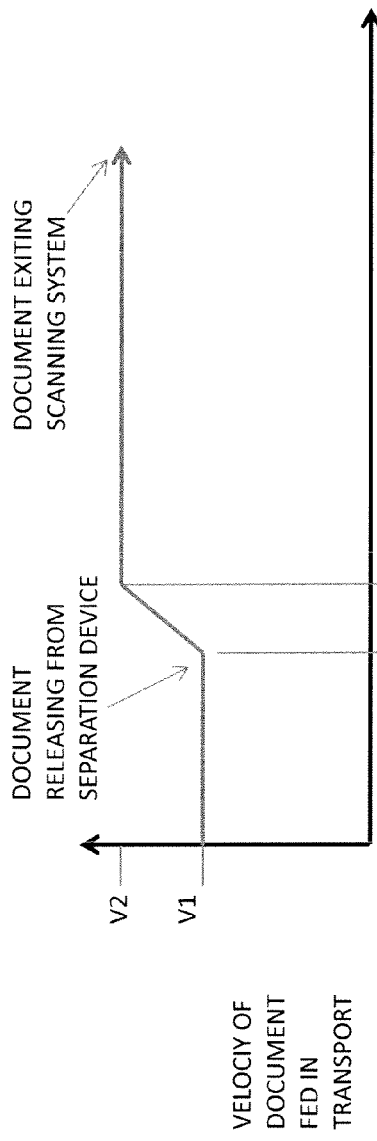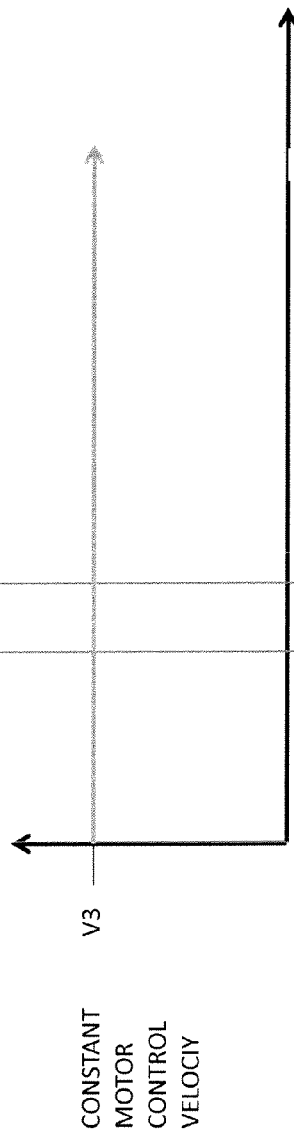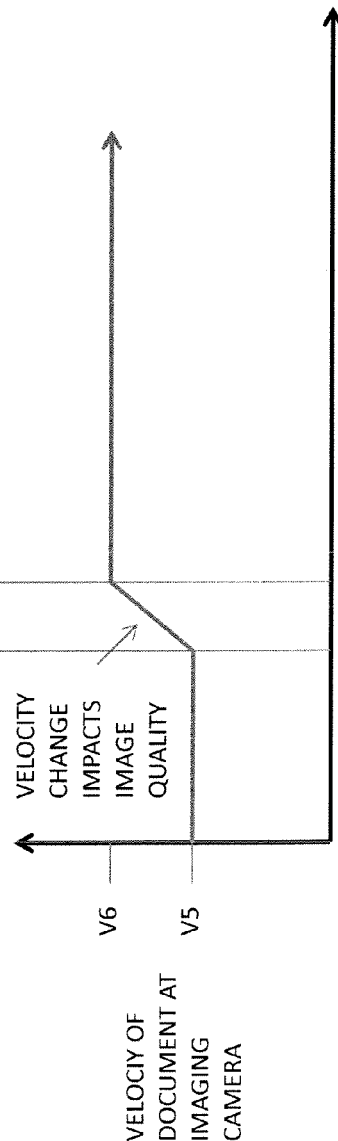

SYSTEM AND METHOD FOR MONITORING AND CONTROLLING DOCUMENT VELOCITY IN A SCANNING SYSTEM

CROSS-REFERENCE TO RELATED APPLICATIONS

This application is a continuation of U.S. patent application Ser. No. 14/287,877, filed on May 27, 2014, which is hereby incorporated by reference in its entirety.

FIELD OF THE INVENTION

The present invention relates to document scanning, and in particular to a system and method of providing an improved document velocity along a document transport and past an imaging camera to improve the scanned document image quality.

BACKGROUND OF THE INVENTION

Document image scanners typically include roller systems forming a transport path for a document fed into the scanner to move the document past imaging devices, such as a linear CCD (charged-coupled device) camera. The roller systems generally include multiple rollers, driven by a single motor or multiple motors, which serve to move the documents along the transport path within the scanner. Typically, when a stack of documents are fed into the entrance of a scanner, they first encounter an urging roller which urges a stack of documents to an adjacent feed roller, which mates with a separation device. The separation device provides a recessive force to the lead edge of a stack of documents and separates a single document from the stack and then advances the single document to transport rollers and past the camera.

However, documents fed through the scanner may cause the different rollers to turn at different velocities. This can lead to transport slippage, misfeeds, and a reduction in image quality. For example, when the trailing edge of a document leaves the separation device the scanner transport may speed up slightly due to the reduction in load on the drive system. These changes in transport speed cause the document to move past the cameras at different speeds, resulting in reductions in image quality. In typical document image scanners which utilize a linear CCD camera, a constant velocity of the document being imaged past the camera is desired, to achieve the best image quality.

What is needed is a system and method to monitor the velocity of the transport system, and in particular the velocity of the rollers within the system. The velocity of various rollers within the system may then be controlled at various times, such as when a document is entering or leaving a new set of rollers, in order to reduce slippage, jams, and improve image quality.

SUMMARY OF THE INVENTION

The invention provides systems and methods for scanning documents, including monitoring and controlling the velocity of the rollers that feed documents into a scanning system and transport the documents through the scanner. The velocity of the rollers may be monitored, and a controller may be provided to adjust the motors driving the rollers, thereby controlling the speed. By monitoring and controlling the velocity profile of the transport system, the scanning system may provide higher image quality and may reduce slippage, misfeeds and jams, and provide alerts to an operator in the event slippage, misfeeds, or jams do occur.

Sensors may be provided to detect the speed of the rollers, and to detect the position of documents transported within the system. For example, document detection sensors may be provided to sense the leading and trailing edges of documents as they move through the transport system. These sensors may detect when a document enters and leaves various rollers, or when it moves past certain components within the system. By tracking the leading and trailing edges of the documents, the scanner may know when to adjust the speed of the rollers or feed the next document from the stack into the scanner.

In addition, monitoring of the scanner transport speed may allow the system to predict when the leading edge of the document should be received at various locations. If the leading edge is not sensed at these locations at the expected time, an alert may be provided to the operator that there is a potential jam or misfeed within the scanning system. These early alerts may reduce the amount of jam damage done, and provide increased accuracy as to the location of the jam. Additional features of the scanner may be monitored and controlled based on the detected speeds along the transport path and detected document edges.

BRIEF DESCRIPTION OF THE DRAWINGS

FIG. 4A is a diagram illustrating the typical velocity of a document fed in a typical scanning system transport.

FIG. 4B is a diagram illustrating the constant velocity of the transport drive motor in the typical scanning system transport.

FIG. 4C is a diagram illustrating the resulting velocity of the document at the imaging camera being imaged in the typical scanning transport system.

DETAILED DESCRIPTION OF THE INVENTION

Figure 1:
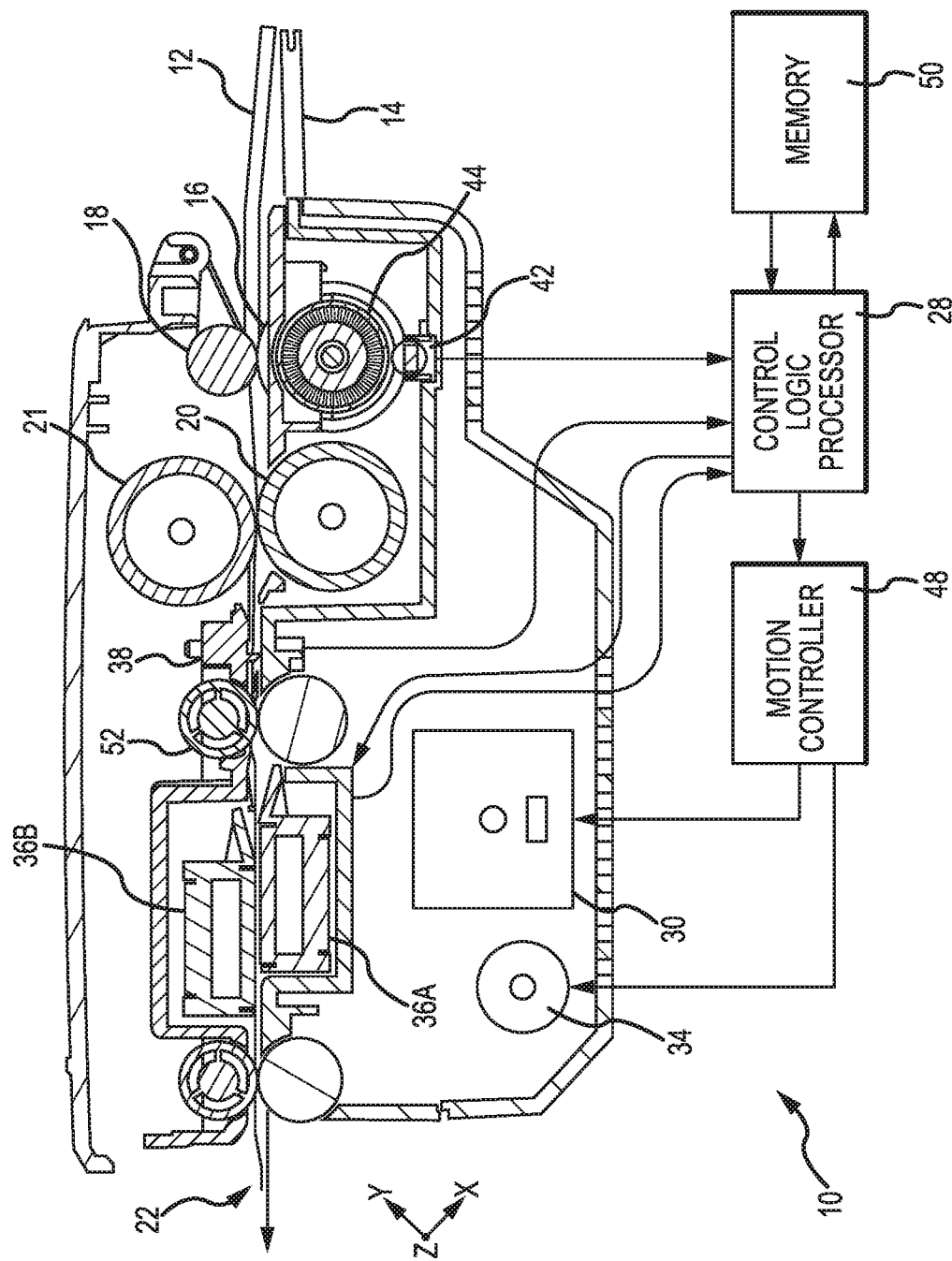
FIG. 1 is a schematic of a scanning system in accordance with an embodiment of the invention that includes a block diagram of the control electronics.
Figure 2:
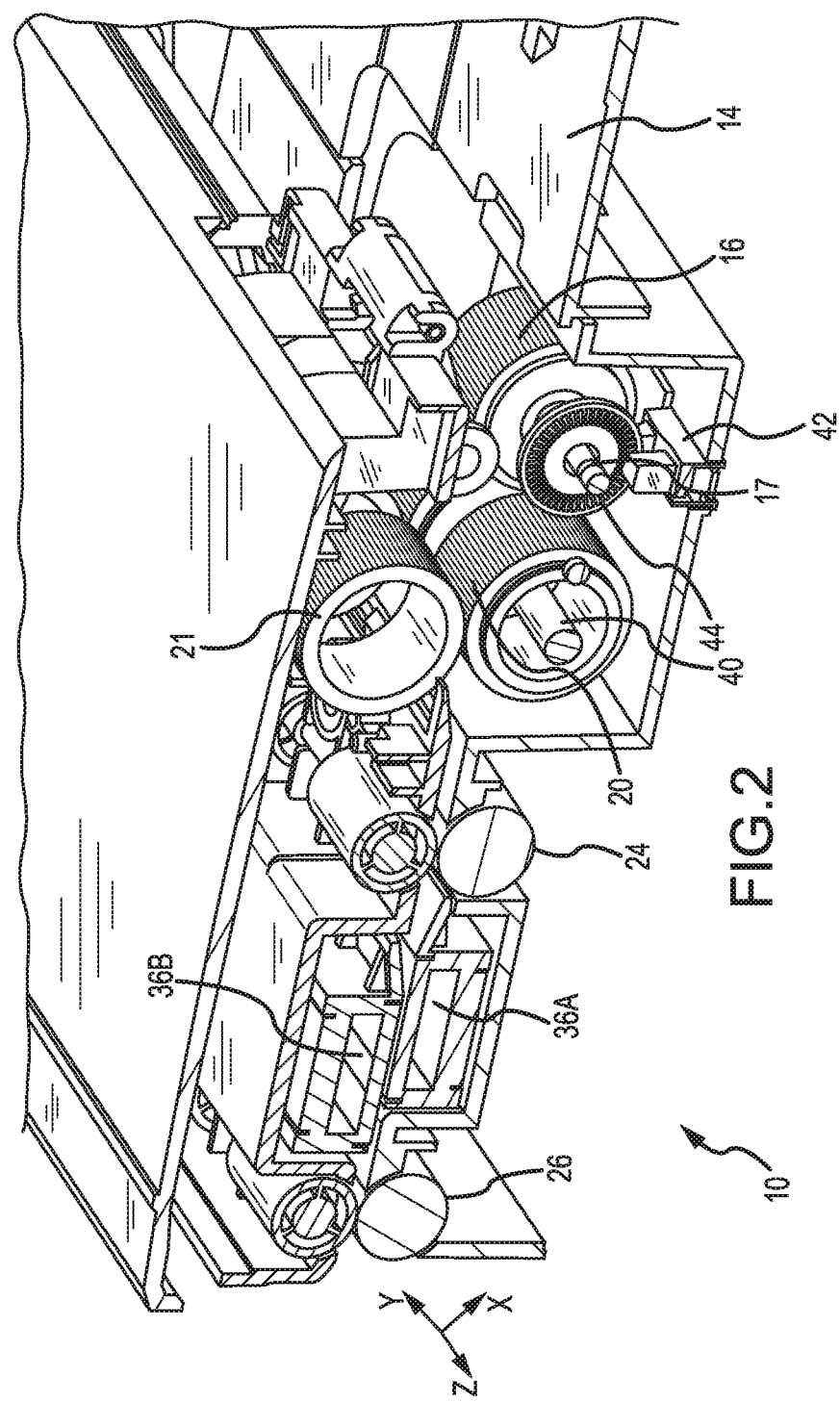
FIG. 2 is a cross section perspective view of a scanning system in accordance with an embodiment of the invention.

The present invention is directed to systems and methods for scanning documents, and for and controlling roller speed along the transport path. The scanning system 10, shown in FIGS. 1 and 2 includes an input tray 14 which supports a document stack 12 that will be separated and driven through the scanning system 10. A motor 30 and clutch 34 are controlled by a motion controller 48 for feeding a document 52 from the document stack 12 and into a series of rollers configured to move the document 52 through the scanning system 10 and past imaging cameras 36A and 36B. As the document is fed past the cameras, its image data is captured and transferred by a control logic processor 28 and then to memory 50. Typically, an urging roller 16 is the first roller at the entrance of the scanning system 10 and makes initial contact with all documents in the document stack 12 being fed along the transport path 22 for imaging. The urging roller 16 has a mating urging pinch roller 18 which provides a nip force against the document stack 12 and the urging roller 16. The nip force helps to insure the urging roller 16 rotates without slippage on the document 52 being fed through this nip. The scanning system 10 includes an urging roller sensor 42 and an urging roller encoder wheel 44, which is rigidly attached to the urging roller 16, to monitor the velocity of the urging roller 16.

Figure 3:
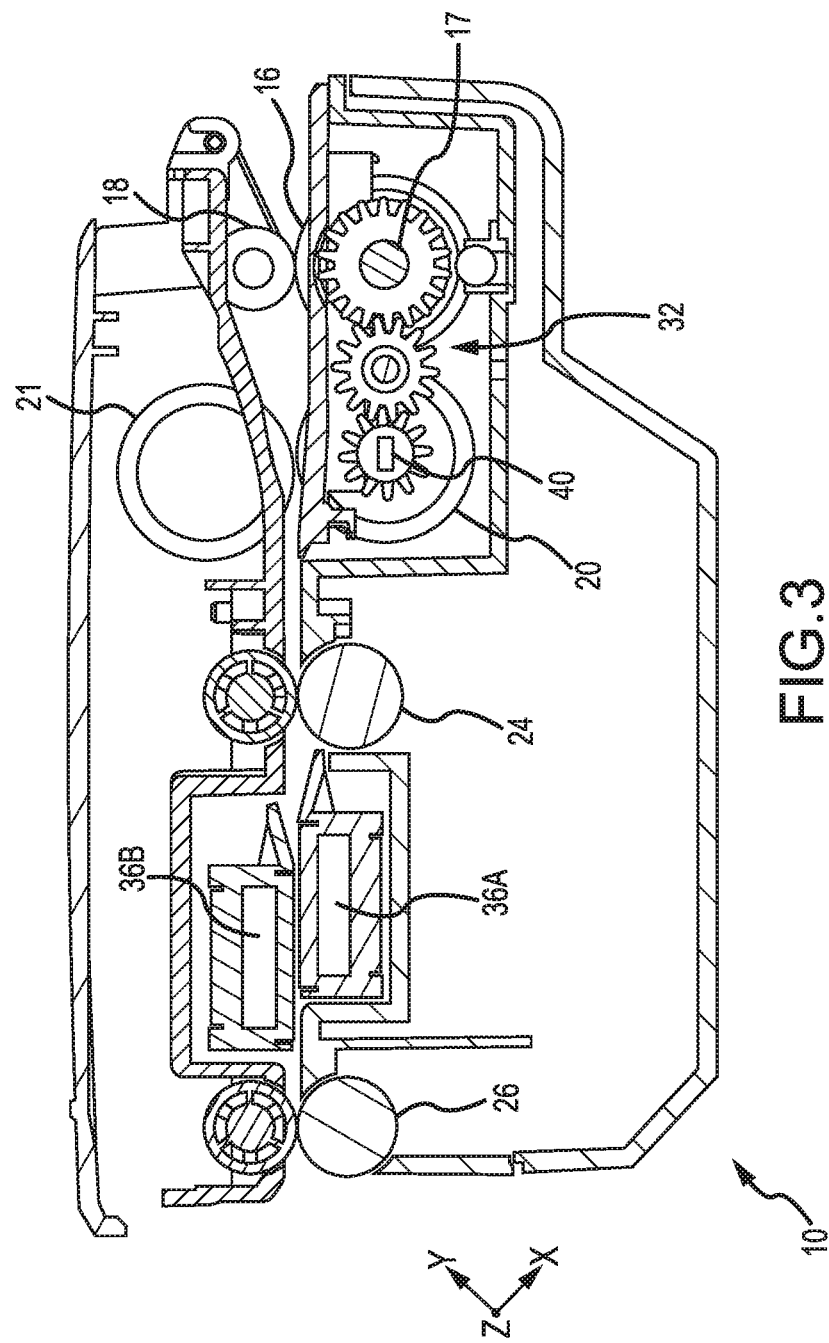
FIG. 3 is view of the gear arrangement between the feeder roller and urging roller.

The scanning system's motor 30 drives the clutch 34 which in turn drives the feed roller drive shaft 40 when the clutch 34 is energized. The feed roller 20 is pivotally mounted on the feed roller drive shaft 40 via a mechanical one-way clutch bearing (not shown), which allows the feed roller 20 to be driven by the clutch 34 as well as be pulled by the document 52 which is transported along the transport path 22. The motor 30 also drives the first and exit transport rollers 24, 26 typically with a belt or gear arrangement (not shown). The urging roller 16 is also pivotally mounted on a mechanical one-way bearing (not shown) which is supported on the urging roller drive shaft 17. The urging drive shaft 17 is driven via a gear arrangement 32, shown in FIG. 3, which is in turn driven by the feed roller drive shaft 40. This described configuration allows both the urging and feed rollers 16, 20 to be driven at different speeds by the motor 30 and gear arrangement 32. Also this configuration allows the document 52 to pull both the urging and feed rollers 16, 20 at a faster rate of speed (than their motor driven speed) by the document 52 traveling in the transport rollers.

The urging roller encoder wheel 44 may be comprised of a small wheel with slots for the urging roller sensor 42 to optically detect. In this embodiment of the invention, the urging roller sensor 42 is a photoelectric thru beam sensor which looks thru the slots in the urging roller encoder wheel 44. Other sensor types and wheel configurations may also be used to achieve the desired result, such as reflective sensors or magnetic sensors. The urging roller sensor 42, with some signal amplification and conditioning, provides a number of positive and negative transitions, corresponding to the number of slots, per revolution. The urging roller 16 diameter and transport velocity may be considered in determining an encoder frequency. For example, the urging roller 16 may be approximately 1.06" in diameter or 3.33" in circumference, the urging roller encoder wheel 44 may have forty slots, and the transport velocity may 10.5"/second. Considering only the position transitions, the encoder frequency for this example is (10.5/3.33)×40=126 Hz. However, the urging roller sensor 42 frequency is not constant. It starts out slow (urging roller 16 speed), then speeds up when the lead edge of the document 52 enters the nip of feed roller 20, then nearly doubles in speed when the lead edge of the document 52 enters the first transport roller 24 nip. The urging roller 16 tangential velocity is 67% of the feed roller 20, which is in turn 52% of the first transport roller 24 and exit transport rollers 26.

The nature of the construction of the urging roller encoder wheel 44 and possible contamination may lead to frequency flutter or occasional missing transitions. Therefore, it may be important to have a method to ignore frequency flutter or occasional missing transitions with a time domain filter. For example, an 8-bit counter may be used and a fixed clock may increment the counter. The encoder clock will reset the counter to zero. If the encoder clock stops, the counter will increment via the fixed clock to a terminal count, such as 4. This terminal count indicates that enough time has passed with no encoder clock to be interpreted as a stoppage of the urging roller. Reaching the terminal count will generate a signal to start the timer or distance counter to predict when the trail edge of the document reaches the feed nip. This time (in distance) is the urging roller to feed roller nip distance (29.0 mm), minus the latency of the counter filter. While the urging roller encoder wheel 44 is turning, the typical count sequence will be 0 1 0 1 0 1 as the fixed clock increments to 1 and the encoder resets to zero. If a few pulses are missing, the sequence will be 0 1 2 3 0 1 0 1. The fixed clock may be biased in a way that increments the counter to be lower than the urging encoder clock. The fixed clock may be unique for each transport speed used.

One or multiple motors 30 are provided to drive the various rollers in the system. The urging roller 16 is driven by a at a slower rotational speed than the next feed roller 20 via a gear arrangement 32 that is connected to the feed roller and urging roller shafts 40, 17. For example, the urging roller 16 may be driven at 66% of speed of the feed roller 20. Both the urging roller 16 and feed roller 20 are supported on one-way bearings (not shown), which allows both rollers to be driven forward by their mating shafts (40,17) and which also allows both rollers to rotate faster than their "driven" speeds when a document 52 in their associated nips is transported (pulled) at a faster transport speed.

The feed roller 20 may be engaged with a fixed elastomeric pad (known as a separation pad) or a separation roller (also known as a retard roller that provides a drag force on the document being transported), thereby creating one separation nip. Alternatively, the feed roller 20 may also be engaged with multiple separation devices 21, such as a fixed pad and a separation roller, thereby creating two separation nips. These nips provide separation force on a stack of documents and are designed to allow only one of the documents 52 in contact with the feed roller 20 and urging roller 16 to be fed into the first transport roller 24 (also called the takeaway roller).

The third nip in the scanning system 10 is the first transport roller 24 and it's mating normal force roller, which is driven at the scanning system transport and cameras 36A, 36B scanning speed. The first transport roller 24 nip driven speed is faster than the feed roller 20 driven nip speed (for example the feed roller 20 nip speed may be 55% of the first transport roller 24 speed) and the feed roller 20 nip speed is faster than the urging roller 16 driven nip speed.

Imaging cameras 36A, 36B are included in the transport path after the first transport roller 24 nip, and are capable of detection of the document 52 lead and trailing edge. After the cameras 36A, 36B, there is an exit transport roller 26 nip that is driven at the same speed as the first transport roller 24 nip. This nip releases the fed documents 52 out of the scanning system 10 after the images are obtained.

In addition to the urging roller sensor 42, the scanning system 10 may have additional sensors after the feed roller 20 nip which can detect the leading or trailing edge of the document 52 being transported. These sensors may be of many types, including ultrasonic sensors or photoelectric.

The urging roller sensor 42 can sense whether a fed document's 52 lead edge speeds up as it enters the feed roller 20 nip by monitoring the urging roller 16 velocity change. It can also sense whether the fed document's lead edge speeds up as it enters the first transport roller 24 nip by monitoring this velocity speed up. The urging roller sensor 42 may also monitor the amount of speed change, and the current speeds of the rollers within the scanning system 10. In addition, the trailing edge of the document fed into the scanner can be sensed at the urging roller 16 nip when it is pulled out of this nip and the urging roller sensor 42 senses a stop in the rotation of the urging roller 16. The urging roller sensor will issue a "roller stopped" signal to indicate that the roller has stopped rotating after a predetermined number of counts without a change in the sensed state of the urging roller. Alternatively, the "roller stopped" signal may be issued after a predetermined time period elapses without a change in the sensed state of the urging roller. This technique provides the capability of the urging roller sensor 42 to be a "document location sensor" by sensing the trailing edge of the fed document 52.

The scanning system 10 includes an auto-document feeding (ADF) system, in which the feed roller 20 nip and urging roller 16 nip section of the scanning system 10 are driven by a main transport motor 30 through an electromagnetic clutch 34. The clutch 34 is energized to drive the urging and feed roller 16, 20 and feed the document 52 to the first transport roller nip 24. When the lead edge of the fed document 52 is in the first transport roller 24 nip, the clutch 34 can be disengaged. When the clutch 34 is disengaged the first transport roller 24 nip and then the exit transport roller 26 nip pull the trailing portion of the document 52 through the urging and feed nips. When the document location sensor 38 senses that the trailing edge of the fed document 52, the clutch 34 can be re-energized to feed the next document 52 from the document stack 12.

By monitoring the scanning system 10 with the urging roller sensor 42, the systems and methods described herein allow for improved image quality, reduction in jams, reductions in slippage, reductions in misfeeds, and improved operator alerts identifying problems.

The scanning system 10 roller transport speed may be adjusted based on the detection of the trailing edge of the fed document 52. Typically when the fed document's 52 trailing end leaves the separation device 21 nip, the scanning systems first and exit transport rollers 24,26 will speed up slightly, because of the reduction of separation drag force on the transported document 52 causes a slight increase in the actual velocity of the document 52. For example, the scanning system transport may speed up by around 1% because of the sudden release of the separation drag force on the document 52 which was under tension. However, in order to maintain the best image quality, it is desired to keep the document 52 being imaged at a constant velocity within the scanning system 10. In order to achieve this, the transport motor 30 velocity clock may be switched from a higher frequency that accounts for separation device 21 drag force to a lower speed at the time of the document 52 releases from the separation device 21 nip. The magnitude of this frequency change may be small, such as about 1.5%, but it is sufficient to provide a more uniform velocity profile for longer documents 52 and enhance magnification accuracy in the document travel direction by a significant amount. This function is beneficial for all transport speeds, which is often needed for different scanning resolutions. The end of the document 52 can be detected in advance of its release from the separation device 21 nip by using the urging roller sensor 42 and knowing the programmed transport speed and distance the urging roller 16 nip is from the separation device 21 nip. As mentioned above, this release may cause the scanning system 10 to speed up, resulting in a loss of image quality of the scanned document. Thus, the transport speed adjustment can be made near the time of the separation device 10 nip release to correct this velocity error for any length document. This adjustment can improve the document 52 captured image length to match the original document 52 length, thereby greatly reducing the effects of the separation device 21 on the velocity of the rollers, transport components, and documents 52. This correction may be especially important for longer documents.

The systems and methods may also allow for jam detection of the fed document 52 based on lead edge detection. The lead edge of the fed document 52 may be detected at the feed roller nip by monitoring the urging roller sensor 42 speed up frequency. There is a known time in which the lead edge of the document should get to the document location sensor 38, first transport roller 24 or imaging cameras 36A, 36B, because the nip speeds and distances are known between each component. Jams of the lead edge of fed documents can be sensed if the lead edge is not at one of these locations at a predetermined time. Thus, monitoring the velocity of the system and the location of the document within the system may increase the location accuracy of sensed jams, and may reduce the amount of jam damage done to the fed document 52, by stopping the feeding process when a jam is sensed. The scanning system 10 may automatically stop the feeding process when such a jam is sensed, or provide an alert to an operator that a jam is present.

The present invention may also allow for detection if a document stack 12 is present in the scanning system input tray 14, and detection of the last document being fed from a document stack 12. The insertion of document stack 12 or a single document 52 into the scanner will rotate the urging roller 16 and provide a signal that documents have been inserted. After the last document 52 has left the scanning system 10 and the clutch 34 is turned on in an attempt to feed another document, the urging roller 16 will not begin to rotate at a faster speed at the predicted time as it would if a document was present in the urging roller nip. Therefore, the system can detect there are no more documents to feed, and the document stack 12 has been completely fed through the scanning system. This technique can be used for end of stack detection.

In addition to detection of documents, the present invention may detect transport roller slippage, which could impact image quality. If there is significant slippage of the document 52 in the first transport roller nip, which may be caused by non-carbon copy paper dirt for example on the rollers, the urging roller 16 speed will rotate at a slower rate than predicted based on the first transport roller 24 (also called the takeaway roller) driven nip speed. By detecting that urging roller 16 is rotating at a slower predicted rate, the scanning system will know that slippage of the document 52 is occurring, and can alert the operator.

The urging roller sensor 42 can also be used to monitor the clutch 34 engagement profile when the clutch 34 is energized to see if it is behaving according to specified parameters. For example, the clutch 34 engagement may be monitored to ensure it is not slipping. After the clutch 34 is energized, it should rotate the feed and urging rollers 20, 16 at the driven speed in an expected, repeatable manner over the life of the clutch 34. Both initial installation evaluation and long term monitoring of this clutch 34 engage profile can be performed using the urging roller sensor 42.

When the ADF clutch 34 is de-energized, the feed and urging roller drive shafts 40,17 should not rotate. If they rotate when the clutch is de-energized, some frictional driving torque is likely being transmitted to the feed and urging roller 20,16 by the clutch, which is not desirable. If this condition occurs, the trailing edge of the fed document 52 is pulled off the urging roller 16, and the next document in the document stack 12 can be urged forward while the first fed document is still within the feeder roller nip. This condition will cause the lead section of the next fed document to buckle, which can cause jams for thin paper types (rice paper for example). Both initial installation evaluation and long term monitoring of this condition can be performed using the urging roller sensor 42.

FIGS. 4A-4C illustrate the velocity within a traditional scanning system. Referring to FIG. 4A, the typical change in the document velocity from V1 to V2 can be seen. This change in document velocity occurs when the trailing end of the document is released from the separation device. The corresponding typical constant velocity V3 of the scanning systems drive motor is shown in FIG. 4B. Because of the release of the separation force on the document trailing end happens when the document's image is being captured, a change in the documents velocity from V5 to V6 at the imaging camera is typically seen (Refer to FIG. 4C). This small change in velocity (typically less than 2%) can impact the image length of the document as well as the geometric accuracy of the image. Therefore, scanned images from documents fed through traditional scanning systems using a constant motor velocity, as illustrated in FIGS. 4A-4C, may experience distortion and loss of image quality due to the changes in velocity as the documents move past the image capturing devices.

As discussed above, aspects of the present invention monitor and control the velocity of the document scanning system to provide higher image quality and reduce slippage, misfeeds and jams. FIGS. 5A-5C and 6A-6C illustrate the improved, more constant document velocity at the image capture devices that may be obtained by controlling the motor velocity to account for expected velocity changes within the scanning device as the documents enter and leave the various rollers.

Figure 5A:
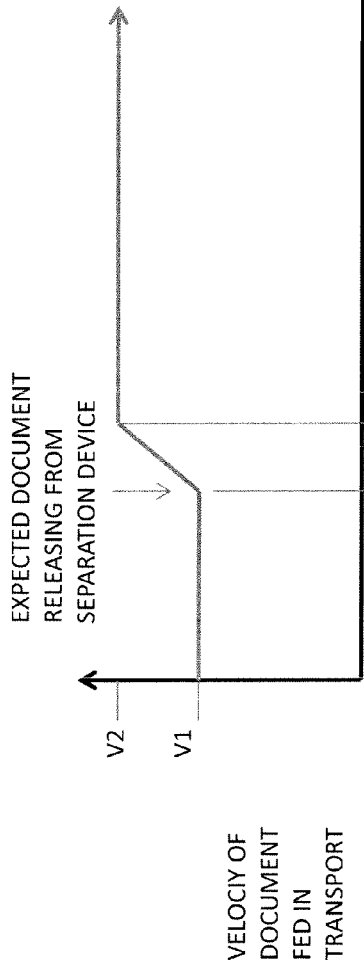
FIG. 5A is another diagram illustrating the typical velocity of a document fed in the scanning system transport.
Figure 5B:
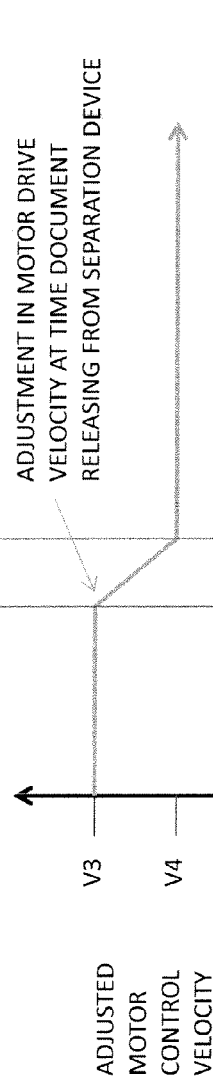
FIG. 5B is a diagram illustrating the adjusted velocity of the transport drive motor in a system implementing aspects of the present invention to monitor and control velocity within the scanning system.
Figure 5C:
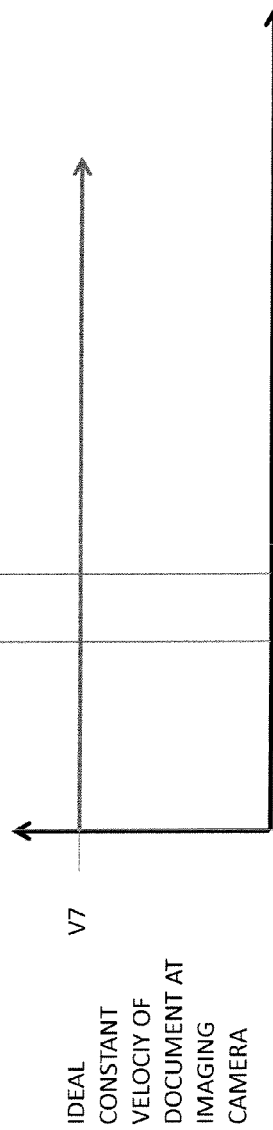
FIG. 5C is a diagram illustrating the resulting constant velocity of the document at the imaging camera being imaged by implementing the velocity control according to aspects of the present invention.

Referring to FIG. 5A, the typical "expected" change in the document velocity from V1 to V2 is shown that occurs when the trailing end of the document is released from the separation device. In order to compensate for this expected change in velocity, adjustments to the motor velocity may be made as described above. An adjusted velocity V3 to V4 of the scanning systems drive motor is shown in FIG. 5B. This change V3 to V4 in motor velocity coincides with the exact change in the document typical velocity change V1 to V2. Also, because the magnitude of the motor velocity adjustment change is equal to that of the document in FIG. 5A, the resulting "actual" document velocity at the imaging cameras is at an ideal constant velocity V7, which is seen in FIG. 5C. These associated figures illustrate the ideal result of this embodiment of the invention, which is a constant document imaging velocity during the entire length of the document.

Figure 6A:
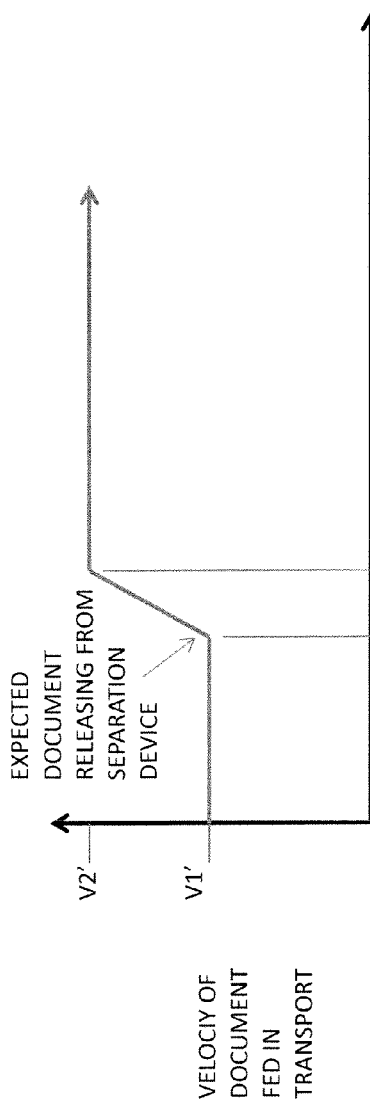
FIG. 6A is a diagram illustrating another typical velocity of a document fed in the scanning system transport.
Figure 6B:
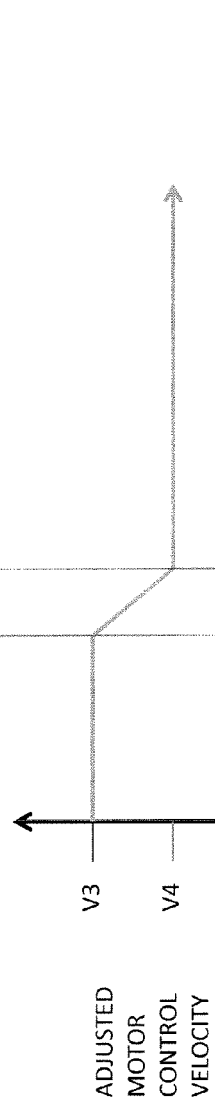
FIG. 6B is a diagram illustrating the adjusted velocity of the transport drive motor in a system implementing aspects of the present invention to monitor and control velocity within the scanning system.
Figure 6C:
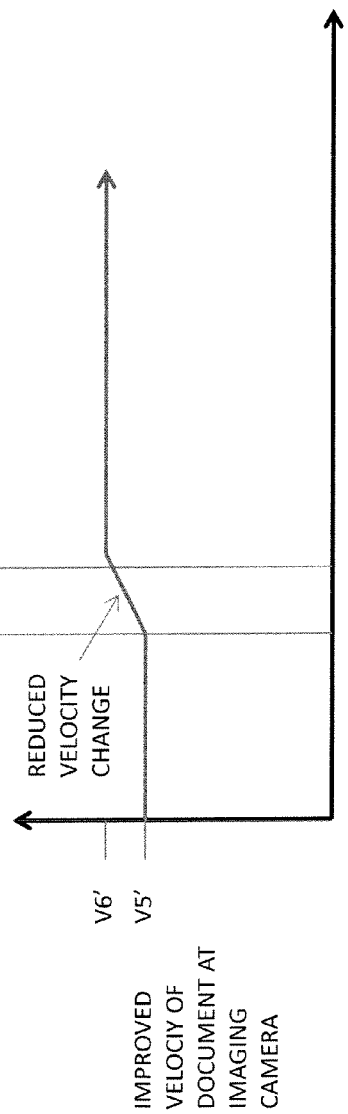
FIG. 6C is a diagram illustrating the resulting improved velocity of the document at the imaging camera being imaged by implementing the velocity control according to aspects of the present invention.

However, even if the magnitude or the exact timing of this scanning system drive motor adjustment is not ideal, it can still result in improved imaging velocities as illustrated in FIGS. 6A, 6B, and 6C as compared to no scanning system drive motor adjustment, as shown in FIGS. 4A, 4B and 4C.

Note that the improved change in velocity V5' to V6' as shown in FIG. 6C, has been reduced as compared to the change in document velocity V5 to V6 being imaged as shown in FIG. 4C in a standard scanning transport with no velocity correction. Even if there are variations in the magnitude and timing of the document expected velocity change, the motor programmed velocity adjustment can greatly improve the document's resulting image quality by counter acting the change in scanning system transport speed that is typically seen when the document is released for the feed roller separation device nip.

PARTS LIST 10 scanning system
12 document stack
14 input tray
16 urging roller
17 urging roller drive shaft
18 urging pinch roller
20 feed roller
21 separation device
22 transport path
24 first transport roller
26 exit transport roller
28 control logic processor
30 motor
32 gear arrangement
34 clutch
36A camera
36B camera
38 document location sensor
40 feed roller drive shaft
42 urging roller sensor
44 urging roller encoder wheel
48 motion controller
50 memory
52 document

The invention claimed is:

1. A system for providing an improved document velocity along a document transport path, the system comprising:
   (a) a plurality of rollers for conveying a document, having a leading edge and a trailing edge, along the document transport path, including at least one urging roller for urging the document into the document transport path and a separation device for separating individual sheets of documents;
   (b) a motor for driving the at least one urging roller with a motor velocity with a clutch disengaging the motor when the leading edge reaches a takeaway roller;
   (c) an urging roller sensor configured to:
      (i) detect a velocity of the at least one urging roller;
      (ii) generate signals representative of the at least one urging roller velocity; and
      (iii) generate a signal to indicate that the at least one urging roller has stopped rotating after a predetermined period of time without a sensed change in the state of the at least one urging roller; and
   (d) a processor configured to detect the trailing edge of the document based on the signal indicating that the at least one urging roller has stopped rotating, and to adjust a speed of at least one of the plurality of rollers based on the detection of the trailing edge.

2. The system of claim 1, further comprising an urging roller encoder wheel attached to the at least one urging roller.

3. The system of claim 2, wherein the urging roller encoder wheel includes a plurality of slots optically detectable by the urging roller sensor.

4. The system of claim 3, further comprising a counter monitoring the turning of the roller encoder wheel, the counter generating a sequence of counts based on the detected slots of the urging roller encoder wheel.

5. The system of claim 1, wherein the speed of at least one of the plurality of rollers is decreased based on the detection of the trailing edge.

6. A method of providing improved document velocity along a document transport path, comprising:
   (a) conveying a document, having a leading edge and a trailing edge, along the document transport path with a plurality of rollers, including at least one urging roller urging the document into the document transport path and a separation device separating individual sheets of documents;
   (b) driving the at least one urging roller with a motor, with a clutch disengaging the motor when the leading edge reaches a takeaway roller;
   (c) detecting a velocity of the at least one urging roller with an urging roller sensor;
   (d) generating, with the urging roller sensor, signals representative of the urging roller velocity; and
   (e) generating, with the urging roller sensor, a signal to indicate that the at least one urging roller has stopped rotating after a predetermined period of time without a sensed change in the state of the at least one urging roller; and
   (f) detecting the trailing edge of the document based on the signal indicating that the at least one urging roller has stopped rotating, and adjusting a speed of at least one of the plurality of rollers based on the detection of the trailing edge.

7. The method of claim 6, wherein an urging roller encoder wheel is attached to the at least one urging roller.

8. The method of claim 7, wherein the urging roller encoder wheel includes plurality of slots, and further comprising optically detecting the slots.

9. The method of claim 8, further comprising monitoring the turning of the roller encoder wheel with a counter, the counter generating a sequence of counts based on the detected slots of the urging roller encoder wheel.

10. The method of claim 6, wherein the speed of at least one of the plurality of rollers is decreased based on the detection of the trailing edge.

* * * * *